United States Patent

Saito et al.

[11] Patent Number: 5,976,660
[45] Date of Patent: Nov. 2, 1999

[54] MAGNETIC RECORDING MEDIUM

[75] Inventors: Shinji Saito; Nobuo Yamazaki, both of Kanagawa, Japan

[73] Assignee: Fuji Photo Film Co., Ltd., Kanagawa, Japan

[21] Appl. No.: 08/843,772

[22] Filed: Apr. 22, 1997

[30] Foreign Application Priority Data

Apr. 24, 1996 [JP] Japan ..................................... 8-102750

[51] Int. Cl.$^6$ ..................................................... G11B 5/706
[52] U.S. Cl. ................. 428/65.3; 428/336; 428/694 BH; 428/694 BS; 428/900
[58] Field of Search .................................. 428/65.3, 336, 428/694 BH, 694 BS, 900

[56] References Cited

U.S. PATENT DOCUMENTS

| | | | |
|---|---|---|---|
| 5,384,175 | 1/1995 | Kojima et al. .............................. | 428/64 |
| 5,512,363 | 4/1996 | Goto et al. ................................ | 428/323 |
| 5,549,955 | 8/1996 | Kawamata et al. ..................... | 428/65.3 |
| 5,597,638 | 1/1997 | Saito et al. ............................... | 428/141 |
| 5,645,917 | 7/1997 | Ejiri et al. ................................ | 428/141 |

*Primary Examiner*—Stevan A. Resan
*Attorney, Agent, or Firm*—Sughrue, Mion, Zinn, Macpeak & Seas, PLLC

[57] ABSTRACT

A magnetic recording medium comprising a non-magnetic support having a substantially non-magnetic undercoating layer on the non-magnetic support and a magnetic layer comprising a ferromagnetic hexagonal ferrite fine powder dispersed in a binder on the undercoating layer in this order, wherein the squareness ratio of the magnetic layer in the perpendicular direction is at least 0.4, the coercive force of the magnetic layer in the perpendicular direction is at least 1,500 Oe, and between the bit minimum inversion interval $Y$ μm and the maximum inversion interval $Z$ μm of the digital signal to be recorded and the thickness $X$ μm of the magnetic layer, there are the relations;

$X \leq Y \leq 0.8$ μm
$Z \leq 1.0$ μm.

The high-density recording characteristics are greatly improved and the occurrence of an error rate is less.

4 Claims, No Drawings

MAGNETIC RECORDING MEDIUM

FIELD OF THE INVENTION

The present invention relates to a magnetic recording medium for high-density recording comprising a non-magnetic support having thereon a non-magnetic layer and a magnetic layer comprising a hexagonal system ferrite fine powder in the uppermost layer, and particularly to a disk-shaped magnetic recording medium.

BACKGROUND OF THE INVENTION

In the field of magnetic recording media, and particular in the field of magnetic disks, an MF-2HD floppy disk of 2 MB using Co-modified iron oxide has been standard-mounded on a personal computer. However, in the recent rapidly increasing the data capacity to be handled, the capacity of the floppy disk is not said to be sufficient and the increase of the capacity of a floppy disk has been desired.

Hitherto, as a magnetic recording medium, a magnetic recording medium formed by coating on a non-magnetic support a magnetic layer formed by dispersing an iron oxide, a Co-modified iron oxide, a ferromagnetic metal powder, or a hexagonal system ferrite fine powder in a binder has been widely used. In these magnetic powders, it is well-known that the ferromagnetic metal fine powder and the hexagonal system ferrite fine powder are excellent in the high-density recording characteristics.

As the large-capacity magnetic recording disk using the ferromagnetic metal fine powder excellent in the high-density recording characteristics, there are MF-2TD of 10 MB and MF-2SD of 21 MB and as the large-capacity magnetic recording disk using the hexagonal system ferrite fine powder excellent in the high-density recording characteristics, there are MF-2ED of 4 MB, 21 MB floptical, etc., but they are yet insufficient in the capacity and the performance.

Since hexagonal ferrite has a perpendicular anisotropy, it is said to be suitable for high-density recording. In JP-A-59-77628, JP-A-61-296525, JP-A-62-287420 and JP-A-62-109226 (the term "JP-A" as used therein means an "unexamined published Japanese patent application"), disk-shaped magnetic recording media each containing perpendicularly oriented hexagonal system ferrite are proposed.

The perpendicularly oriented hexagonal system ferrite are certainly excellent in the output and D50 (recording density) but there is a case that the error rate, which finally becomes important as the digital recording characteristics is rather greatly inferior. The reason is considered to be that when the disk-shaped magnetic recording medium is recorded and reproduced on the ring head in the case of having many perpendicular magnetization components, the wave form becomes a die pulse form, whereby an accurate peak cannot be detected. In the case of being randomly oriented, the hexagonal system ferrite has relatively many magnetization components in the perpendicular direction, whereby an under shoot occurs to form a wave form having an inferior symmetrical property and a similar problem to above occurs.

These problems described above become an obstacle to the practical use of hexagonal system ferrite having many perpendicular magnetization components. On the other hand, it has been investigated that perpendicular recording is performed using a single magnetic head and a wave form is made a single peak pulse but there are many problems for reaching a practically useful level.

As constitution of a disk-form magnetic recording medium having a non-magnetic undercoating layer or interlayer, there are proposed a constitution having an electrically conductive layer and a magnetic layer containing a metal fine powder as described in JP-A-3-120613, a constitution having a magnetic layer having a thickness of 1 $\mu$m or less and a non-magnetic layer as described in JP-A-6-290446, a constitution having a carbon interlayer and a magnetic layer containing a lubricant as described in JP-A-62-159337, and a constitution having a non-magnetic layer wherein the carbon size is regulated as described in JP-A-5-290358.

On the other hand, recently, a disk-shaped magnetic recording medium comprising a thin magnetic layer and a functional non-magnetic layer has been developed and a floppy disk of a 100 MB class has appeared. As such the floppy disk showing the foregoing features there are proposed a constitution having a magnetic layer having Hc of 1400 Oe or more and a thickness of 0.5 $\mu$m or less and a non-magnetic layer containing electrically conductive particles as described in JP-A-5-109061, a constitution containing abrasive having a larger size than the thickness of the magnetic layer thereof as described in JP-A-5-197946, a constitution having a magnetic layer having a thickness of 0.5 $\mu$m or less, wherein the thickness deviation of the magnetic layer is restricted within ±15% and the surface electric resistance is regulated as described in JP-A-5-290354, and a constitution containing 2 kinds of abrasive each having different particle sizes and wherein the amounts of the abrasive on the surface are regulated as described in JP-A-6-68453.

However, with the recent rapid requirement of more increasing the recording density of a disk-shaped magnetic recording medium, even by using the techniques described above, it becomes difficult to obtain the disk-shaped magnetic recording medium having sufficient characteristics, that is, the characteristics of high-density recording and showing a low error rate. As one of the causes, there is a cause that the general relation paying attention to each element in the magnetic recording medium having the thin magnetic layer as described above relating the mode of a digital signal and the mode of the electromagnetic characteristics of the magnetic recording medium to said magnetic layer thickness has not yet been found.

SUMMARY OF THE INVENTION

The object of the present invention is to provide a magnetic recording medium having the improved electromagnetic characteristics, in particular the greatly improved high-density recording characteristics and showing a less error rate.

As the result of various investigations for not only improving the electromagnetic characteristics of an hexagonal system ferrite having perpendicular magnetization components but also reducing the occurrence of an error rate, which is most important for practical use, the inventors have discovered that the above object can be achieved by the magnetic recording medium described below and have attained the present invention.

That is, the present invention relates to a magnetic recording medium comprising a non-magnetic support having a substantially non-magnetic undercoating layer on the non-magnetic support and a magnetic layer comprising a ferromagnetic hexagonal ferrite fine powder dispersed on the undercoating layer in a binder in this order, wherein the squareness ratio SQp of the magnetic layer in the perpendicular direction is at least 0.4, the coercive force Hcp of the magnetic layer in the perpendicular direction is at least 1,500 Oe, and between the bit minimum inversion interval Y µm and the maximum inversion interval Z µm of digital signals to be recorded and the thickness X µm of the magnetic layer, there are the following relations;

$X \leq Y \leq 0.8$ µm $Z \leq 1.0$ µm.

That is, the inventors have found that the magnetic recording medium having the excellent high-density recording characteristics and a less error rate together, which have never been obtained by conventional techniques, can be obtained.

In this case, the bit minimum inversion interval Y is the minimum value of the inversion interval of a modulated signal bit string and corresponds to ½ of the shortest recording wavelength. Also, the maximum inversion interval Z is the maximum value of the inversion interval of a modulated signal bit string.

DETAILED DESCRIPTION OF THE INVENTION

The present invention is described in detail below.

In the relation formulae in this invention described above, there are no particular restrictions on Y and Z if Y and Z satisfy the foregoing formulae but the relation of Y and Z can be determined by a modulation system of digital signals. In the present invention, an MFM modulation system and a (2,7) RLLC modulation system are suitable. In the present invention, in the MFM modulation, Z/Y becomes 2 and in the (2,7) RLLC modulation, Z/Y becomes 8/3.

The magnetic recording medium of the present invention is particularly suitable as a disk-form magnetic recording medium.

The reason of obtaining the foregoing effects by the present invention has not yet been decisively clarified but is considered to be as follows.

That is, when an isolated inverse signal is recorded on the magnetic layer comprising a ferromagnetic hexagonal system ferrite fine powder (hereinafter, is sometimes referred as "hexagonal system ferrite" or "hexagonal ferrite") having relatively many perpendicular magnetization components, the wave form becomes a distorted wave form having an under shoot and when the magnetic layer is positively perpendicularly oriented, the wave form becomes a die pulse wave form. Such a phenomenon is not changed by increasing the recording density to some extent and even if the output of each signal is high, since the position of the signal peak is shifted, the detection of the signal becomes difficult. However, the inventors have noticed that by further increasing the recording density, the regenerated wave form becomes apparently a single peak pulse form. This is considered to be that the regenerated wave forms of the adjacent inverted bits interfere each other and in particular, when die pulse wave forms each having a different polarity are superposed with each other, the wave forms become apparently a single peak pulse wave form. However, these are insufficient. This is because since the signals of digital recording are generally composed of a bit string constituted by different bit intervals, not only the single peak pulse wave form is obtained by one bit interval but also a single peak bit wave form must be obtained by all the bit intervals constituting the bit string. Thus, the inventors determined the recording density (bit interval) that regenerated wave forms become a single peak pulse-form wave form in the magnetic recording medium of hexagonal system ferrite having perpendicularly magnetization components and have proposed that the signal modulation system wherein all the bit intervals become the recording density range can be applied. Thereby, in the above magnetic recording medium of the present invention, a high output and high S/N are obtained, the peak detection can be facilitated, and greatly low error rate can be realized. Also, it has been found that the decreasing of the thickness of the magnetic layer as compared with the bit minimum inversion interval, SQp, and Hcp are important for reducing the error rate and as a result, the relation formula described above in the present invention are obtained.

The preferred embodiments of the present invention are as follows.

It is preferred that between the bit minimum inversion interval Y µm and the maximum inversion interval Z µm of the digital signals to be recorded and the thickness X µm of the magnetic layer, there are following relationships $X \leq Y \leq 0.5$ µm $Z \leq 1.0$ µm, and it is more preferred that there are the following relationships $X \leq Y \leq 0.3$ µm $Z \leq 0.6$ µm.

The coercive force Hcp in the perpendicular direction is preferably at least 2,000 Oe.

The magnetic recording medium of the present invention has perpendicular magnetization components and practically SQp is at least 0.4, preferably at least 0.6, and more preferably at least 0.8. In this case, SQp is the value of not applying a diamagnetic field correction.

[Hexagonal System Ferrite]

As the hexagonal system ferrite contained in the uppermost layer of the present invention, there are the substituent of each of barium ferrite, strontium ferrite, lead ferrite and calcium ferrite, Co-substituents, etc. Practically, the concrete examples include magnetoplumbite-type barium ferrite and strontium ferrite, a magnetoplumbite-type ferrite the surfaces of the particles of which are covered with spinel, and further magnetoplumbite-type barium ferrite and strontium ferrite partially containing a spinel phase, etc. Also, the hexagonal ferrite for use in this invention may contain other atom(s) such as Al, Si, S, Sc, Ti, V, Cr, Cu, Y, Mo, Rh, Pd, Ag, Sn, Sb, Te, Ba, Ta, W, Re, Au, Hg, Pb, Bi, La, Ce, Pr, Nd, P, Co, Mn, Zn, Ni, Sr, B, Ge, Nb, etc., in addition to the definite atom.

In general, the hexagonal ferrite containing the elements such as Co—Ti, Co—Ti—Zr, Co—Ti—Zn, Ni—Ti—Zn, Nb—Zn—Co, Sb—Zn—Co, Nb—Zn, etc., can be used. According to the raw materials and the production methods, the ferrite sometimes contains other specific impurities.

The particle sizes of the hexagonal ferrite are from 10 to 200 nm, and more preferably from 20 to 100 nm as a hexagonal tabular diameter.

In the case of reproducing with a magnetic resistance head, it is necessary to make low noise and the tabular diameter is preferably 40 nm or less but when the diameter of 10 nm or less, stable magnetization is not obtained owing to the thermal fluctuation. Also, when the tabular diameter is larger than 200 nm, the occurrence of noise becomes high. Thus, both cases described above are unsuitable for high-density magnetic recording. The tabular ratio (tabular diameter/tabular thickness) is preferably from 1 to 15, and more preferably from 2 to 7. If the tabular ratio is less than 1, the packing ratio of the ferrite in the magnetic layer becomes preferably high but a sufficient orientation is not obtained. On the other hand, if the tabular ratio is larger than 15, the noise is increased by stacking among the particles.

The specific surface area of the particle size range by a BET method shows from 10 to 200 m²/g. The specific surface area is preferably from 30 to 70 m²/g but in the system of requiring a low noise, for example, in the case of reproducing by a magnetic resistance head (e.g., MR head and GMR head), etc., it is preferred to increase the specific area and reduce the particle sizes. The specific surface area generally coincides with the arithmetically calculated value from the particle tabular diameter and the tabular thickness.

The crystallite size is from 50 to 450 Å, and preferably from 100 to 350 Å. The distributions of the particle tabular diameters and the tabular thicknesses are usually preferably as narrow as possible. It is difficult to show the distributions by numeral value but they can be compared by randomly measuring 500 particles by a particle TEM photograph. The distributions are frequently a case of not normal distributions and by showing the distribution as the standard deviation to the average size by calculation, usually σ/average size is from 0.1 to 2.0, and preferably from 0.1 to 0.5. For making the particle size distribution sharp, it is carried out to make the particle forming reaction system as uniform as possible and also to apply a distribution-improving treatment to the particles formed. For example, a method of selectively dissolving super fine particles in an acid solution, etc., are well-known.

The hexagonal (system) ferrite having a coercive force Hc of 500 Oe to 5,000 Oe measured can be prepared. Higher Hc is useful for high-density recording but is restrained by the faculty of a magnetic head. The coercive force Hc is usually from 800 Oe to 4,000 Oe, and preferably from 1,500 Oe to 3,000 Oe. When the saturation magnetization of a magnetic head is more than 1.4 tesla, Hc is preferably 2000 Oe or more. Hc can be controlled by the particle size (tabular diameter, tabular thickness), the kinds and the amounts of the elements contained, the substitution site of the element, the particle forming reaction condition, etc.

The saturation magnetization as is from 40 e.m.u./g to 80 e.m.u./g. The saturation magnetization as is preferably higher but there is a tendency that as becomes smaller as the particle sizes become finer. It is well known that for improving as, a spinel ferrite is composited to a magnetoplumbite ferrite and the kind and the addition amount of the element to be contained are selected, etc.

Also, a W-type hexagonal system ferrite can be used.

At dispersing the hexagonal (system) ferrite, it is carried out by treating the surface of the magnetic particles with a dispersion medium or a material suitable for the polymer. As the surface treating material, an inorganic compound or an organic compound is used. As the main compound, there are the oxides or hydroxides of Si, Al, P, etc., various kinds of silane coupling agents, and various kinds of titanium coupling agents. The amount of the compound is from 0.1 to 10% by weight to the amount of the hexagonal (system) ferrite.

Also, pH of the hexagonal (system) ferrite is important for the dispersion thereof. Usually, pH which is most suitable for the dispersion medium and polymer is from about 4 to 12 but pH is selected to be from 6 to 10 from the chemical stability and preservability of the medium. Water containing in the hexagonal (system) ferrite also gives an influence of the dispersion of the ferrite. There is the optimum value of the water content according to the kinds of the dispersion medium and the polymer but the water content is usually from 0.01 to 2.0% by weight.

As the production method of the hexagonal (system) ferrite, there are a glass crystallization method, a coprecipitation method, a hydrothermal reaction method, etc., and the foregoing method can be used in the present invention without any selection.

For example, as a production method of a barium ferrite, there are (1) a glass crystallization method of mixing a metal oxide substituting barium oxideeiron oxide-iron and boron oxide, etc., as a glass-forming substance such that the mixture becomes a ferrite composition, melting the mixture, quenching the mixture to form an amorphous material, and then after re-heat-treating, washing and grinding the heat-treated material to provide barium ferrite crystal powders, (2) a hydrothermal reaction method of neutralizing a solution of a metal salt of a barium ferrite composition with an alkali, after removing by-products, heating the solution at a temperature of 100° C. or higher, washing, drying, and grinding the product to provide barium ferrite crystal powders, and (3) a co-precipitation method of neutralizing a solution of a metal salt of a barium ferrite composition with an alkali, after removing by-products, drying, treating the product at a temperature of 1100° C. or lower, and grinding the product to provide barium ferrite crystal powders.

[Undercoating Layer]

The undercoating layer in the present invention fundamentally comprises a binder and a non-magnetic powder. Hereinafter, the undercoating layer is referred to as a lower layer or a non-magnetic layer.

As the non-magnetic powder, carbon black may be used. The undercoating layer also may contain a non-magnetic inorganic powder but the non-magnetic inorganic powder used is in the different category from carbon black as the non-magnetic powder described above in the present invention.

The non-magnetic inorganic powder which is used for the undercoating layer is selected from the group consisting of inorganic compounds such as metal oxides, metal carbonates, metal sulfates, metal nitrides, metal carbides, metal sulfides, etc.

Practically, as the inorganic compound, for example, α-alumina of α-conversion of at least 90%, β-alumina, γ-alumina, θ-alumina, silicon carbide, chromium oxide, cerium oxide, α-iron oxide, goethite, corundum, silicon nitride, titanium carbide, titanium oxide, silicon dioxide, tin oxide, magnesium oxide, tungsten oxide, zirconium oxide, boron nitride, zinc oxide, calcium oxide, calcium sulfate, barium sulfate, molybdenum disulfite, etc., can be used singly or as a combination of them. Particularly preferred inorganic compounds are titanium dioxide, zinc oxide, iron oxides, and barium oxide, and more preferred inorganic compounds are titanium dioxide and α-iron oxide from the points of the small particle distribution and having many functional imparting means.

The particle sizes of the non-magnetic inorganic powder are preferably from 0.005 to 2 μm and if necessary, the non-magnetic inorganic powders each having different particle sizes may be combined or even in the case of a single non-magnetic inorganic powder, same effect as the foregoing combination can be obtained by widening the particle size distribution of the inorganic powder. The particularly preferred particle sizes of the non-magnetic inorganic powder are from 0.01 μm to 0.2 μm. In particular, when the non-magnetic inorganic powder is a granular metal oxide, the average particle sizes are preferably 0.08 μm or less and when the non-magnetic inorganic powder is an acicular metal oxide, the long axis length is preferably 0.3 μm or less.

The tapping density of the non-magnetic inorganic powder is from 0.05 to 2 g/ml, and preferably from 0.2 to 1.5 g/ml.

The water content of the non-magnetic inorganic powder is from 0.1 to 5% by weight, preferably from 0.2 to 3% by weight, and more preferably from 0.3 to 1.5% by weight. Also, pH of the non-magnetic inorganic powder is from 2 to 11, and is particularly preferably in the range of from 5.5 to 10.

The specific surface area of the non-magnetic inorganic powder is from 1 to 100 m$^2$/g, preferably from 5 to 80 m$^2$/g, and more preferably from 10 to 70 m$^2$/g. The crystallite sizes of the non-magnetic inorganic powder are preferably from 0.004 $\mu$m to 1 $\mu$m, and more preferably from 0.04 to 0.1 $\mu$m. The oil absorption of the non-magnetic inorganic powder using dibutyl phthalate (DBP) is from 5 to 100 ml/100 g, preferably from 10 to 80 ml/100 g, and more preferably from 20 to 60 ml/100 g. The specific gravity thereof is from 1 to 12, and preferably from 3 to 6. Also, the form of the non-magnetic inorganic powder may be an acicular form, a spherical form, a polyhedral form, or a tabular form.

The ignition loss of the non-magnetic inorganic powder is preferably 20% by weight or lower and it is considered that fundamentally the ignition loss is most preferably zero. Also, the non-magnetic inorganic powder for use in this invention having a Mohs' hardness of from 4 to 10 is preferred. The roughness factor of the surfaces of these powders is preferably from 0.8 to 1.5, and more preferably from 0.9 to 1.2.

The adsorption amount of stearic acid (SA) onto the non-magnetic inorganic powder is from 1 to 20 $\mu$mol/m$^2$, preferably from 2 to 15 $\mu$mol/m$^2{}_1$, and more preferably from 3 to 8 $\mu$m. The heat of wetting of the non-magnetic inorganic powder to water at 25° C. is preferably in the range of from 200 erg/cm$^2$ to 600 erg/cm$^2$.

Furthermore, a solvent having the heat of wetting of the range described above can be used and pH of the solvent is preferably from 3 to 6.

The content of water-soluble Na in the non-magnetic inorganic powder is from 0 to 150 ppm and the content of water-soluble Ca is from 0 to 50 ppm.

It is preferred to surface-treating the surface of the non-magnetic inorganic powder with Al$_2$O$_3$, SiO$_2$, TiO$_2$, ZrO$_2$, SnO$_2$, Sb$_2$O$_3$, ZnO, or Y$_2$O$_3$. The particularly preferred treating compounds for the dispersibility are Al$_2$O$_3$, SiO$_2$, TiO$_2$, and ZrO$_2$ and more preferred compounds are Al$_2$O$_3$, SiO$_2$, and ZrO$_2$. They can be used singly or as a combination of them.

Also, according to the purpose, a co-precipitated surface treated layer may be used, and also a method of first treating the surface with alumina and thereafter treating the surface layer with silica, or the contrary method can be employed. Also, according to the purpose, the surface treated layer may be a porous layer but a homogeneous and dense treated layer is generally preferred.

As specific examples of the non-magnetic inorganic powder which is used for the undercoating layer in the present invention, include Nanotite (trade name, made by SHOWA DENKO K.K.), HIT-100 and ZA-G1 (trade names, made by Sumitomo Chemical Company, Limited), α-hematites; DPN-250, DPN-250BX, DPN-245, DPN-270BX,-DBN-SA1, and DBN-SA3 (trade names, made by Toda Kogyo K.K.), titanium oxide; TTO-51B, TTO-55A, TTO-55B, TTO-55C, TTO-55S, TTO-55D, and SN-100; α-hematite; E270, E271, E300, and E303 (trade names, made by ISHIHARA SANGYO KAISHA, LTD.), titanium oxide; STT-4D, STT-30D, STT-30, and STT-65C, α-hematite; α-40 (trade names, made by Titan Kogyo K.K.), MT-100S, MT-100T, MT-150W, MT-500B, MT-600B, MT-100F, and MT-500HD. (trade names, made by TEIKA K.K.), FINEX-25, BF-1, BF-10, BF-20, and ST-M (trade names, made by Sakai Chemical Industry Co., Ltd.), DEFIC-Y and DEFIC-R (trade names, made by DOWA MINING CO., LTD.), AS2BM and TiO2P25 (trade names, made by JAPAN AEROSIL CO., LTD.), 100A and 500A (trade names, made by Ube Industries, Ltd.), and the calcined products of them.

The particularly preferred non-magnetic inorganic powders are titanium dioxide and α-titanium dioxide.

In these compounds, α-iron oxide (hematite) is practiced under the following conditions.

That is, the α-Fe$_2$O$_3$ particle powder is prepared as the precursor the acicular goethite particles obtained by (1) a method of forming acicular goethite particles by carrying out the oxidation reaction by passing an oxygen-containing gas through a suspension containing a ferrous hydroxide colloid obtained by adding at least equivalent amount of an aqueous alkali hydroxide solution to an aqueous ferrous salt solution at pH of 11 or higher-and at a temperature of 80° C. or lower, (2) a method of forming spindle-shaped goethite particles by carrying out the oxidation reaction by passing an oxygen-containing gas through a suspension containing FeCO$_3$ obtained by reacting an aqueous ferrous salt solution and aqueous alkali carbonate solution, (3) a method of forming acicular goethite nucleus particles by carrying out the oxidation reaction by passing an oxygen-containing gas through an aqueous ferrous salt solution containing a ferrous hydroxide colloid obtained by adding less than equivalent amount of an aqueous alkali hydroxide solution or an aqueous alkali carbonate solution to an aqueous ferrous salt solution and then after adding an aqueous alkali hydroxide solution to the aqueous ferrous salt solution containing said acicular goethite nucleus particles in an amount of at least equivalent to the amount of Fe$^{2+}$ in said aqueous ferrous salt solution, growing the foregoing acicular goethite nucleus particles by passing therethrough an oxygen-containing gas, or (4) a method of forming acicular goethite nucleus particles by carrying out the oxidation reaction by passing an oxygen-containing gas through an aqueous ferrous salt solution containing a ferrous hydroxide colloid obtained by adding less than equivalent amount of an aqueous alkali hydroxide solution or an aqueous alkali carbonate solution to an aqueous ferrous salt solution, and then growing the foregoing acicular goethite nucleus particles in an acidic or neutral range.

In addition, during the reaction of forming the goethite particles, a different element such as Ni, Zn, P, Si, etc., may be added thereto for improving the characteristics of the particle powder formed.

By dehydrating the acicular goethite particles, which are the precursor particles, at a temperature range of from 200 to 500° C. or, if necessary, further annealing the acicular goethite particles by heat treating at a temperature range of from 350 to 800° C., acicular α-Fe$_2$O$_3$ particles are obtained. In addition, a sintering inhibitor such as P, Si, B, Zr. Sb, etc., may be attached to the surfaces of the acicular goethite particles which are dehydrated or annealed. The acicular goethite particles are annealed by heat-treating the goethite particles at the temperature range of from 350 to 800° C. in the above step. This is because it is preferred that the voids formed on or in the surfaces of the acicular α-Fe$_2$O$_3$ particles obtained by the dehydration are closed by melting the surfaces of the particles by annealing to make the surfaces smooth form.

The α-Fe$_2$O$_3$ particle powder which is used in the present invention is obtained by dispersing the acicular α-Fe$_2$O$_3$ particles obtained by dehydrating or annealing as described above in an aqueous solution to form a suspension, adding an Al compound to the suspension, after covering the surfaces of the α-Fe$_2$O$_3$ particles with the foregoing added compound by adjusting pH of the mixture, filtering, water-washing, drying, grinding, and, if necessary, further applying a degassification, compressing treatment, etc.

In this case, as the Al compound used, an aluminum salt such as aluminum acetate, aluminum sulfate, aluminum chloride, aluminum nitrate, etc., or an alkali aluminate such as sodium aluminate, etc., can be used. The addition amount of the Al compound in this case is from 0.01 to 50% by weight as an Al conversion to the amount of the α-Fe$_2$O$_3$ particle powder. If the addition amount thereof is less than 0.01% by weight, the dispersion in the binder resin is insufficient, while if the addition amount is more than 50% by weight, the Al compounds floated on the particle surfaces undesirable cause an interaction with each other.

The non-magnetic inorganic powder of the lower layer in the present invention can be covered with an Si compound as well as with at least one kind of a compound selected from the compounds of P, Ti, Mn, Ni, Zn, Zr, Sn, and Sb together with the Al compound described above. The addition amount of the compound which is used together with the Al compound is in the range of from 0.01 to 50% by weight to the α-Fe$_2$O$_3$ particle powder. If the addition amount of the compound is less than 0.01% by weight, the improving effect of the dispersibility is scarcely obtained by the addition of the compound and if the addition amount is more than 50% by weight, the Al compounds floated on the particle surfaces undesirable cause an interaction with each other.

The production method of titanium dioxide is as follows. As the production method of titanium oxide, there are mainly a sulfuric acid method and a chlorine method.

In the sulfuric acid method, the original ore of ilumenite is digested with sulfuric acid and Ti, Fe, etc., are extracted as the sulfates. Iron sulfate is removed by a crystallization separating and after filtering and purifying the remaining titanyl sulfate solution, a thermal hydrolysis is applied thereto to precipitate hydrous titanium hydroxide. After filtering and washing the precipitated titanium hydroxide, impurities contained are removed with washing and after adding thereto a particle size controlling agent, etc., the mixture is calcined at a temperature of from 80 to 1,000° C. to provide crude titanium oxide. The rutile type and the anatase type is selected by the kind of the nucleating agent added at the hydrolysis. By applying grinding, a particle regulation, a surface treatment, etc., to the crude titanium oxide, desired titanium dioxide is obtained.

As the original ore in the chlorine method, natural rutile or synthetic rutile is used. When the ore is chlorinate in a high-temperature reducing state, Ti becomes TiCl$_4$ and Fe becomes FeCl$_2$ and iron oxide which becomes solids by cooling is separated from TiCl$_4$. After purifying crude TiCl$_4$ obtained by a rectification, a nucleating agent is added to TiCl$_4$ thus purified and the mixture is instantly reacted with oxygen at a temperature of 1,000° C. or higher to provide crude titanium oxide. A finishing method of imparting a pigment-like property to crude titanium oxide formed in the oxidative decomposition step is the same as the method in the sulfuric acid method described above.

In the case of applying the surface treatment, first, after dry grinding the titanium oxide material obtained in the above step, water and a dispersing agent are added to the ground material and the classification of crude particles is carried out by wet grinding and an centrifugal separation. Thereafter, the fine particle slurry is transferred to a surface treating bath, wherein the surface covering with a metal hydroxide is carried out. First, a definite amount of an aqueous solution of salt of Al, Si, Ti, Zr, Sb, Sn, Zn, etc., is added to the slurry and an acid or an alkali for neutralizing the mixture is added to cover the surfaces of the titanium oxide particles with a hydrous oxide formed. By-produced water-soluble salts are removed by a decantation, a filtration, and washing, finally pH of the slurry is adjusted, and after filtering the slurry, the residue is washed with pure water. The cake thus washed is dried by a spray dryer or a band dryer. Finally, the dried product is ground by a jet mill to provide a product.

Also, the vapor of AlCl$_3$ or SiCl$_4$ is applied to the titanium oxide powder and thereafter by passing steam therethrough, an Al or Si surface treatment can be also applied.

About other production methods of pigments, the descriptions of G. D. Parfitt and K. S. W. Sing, *Characterization of Powder Surfaces*, Academic Press, 1976 can be referred to.

When the surface electric resistance Rs is lowered by mixing carbon black in the undercoating layer, which is a well-known effect, the light transmittance can be reduced and also a desired micro-Vickers hardness can be obtained. Also, by incorporating carbon black in the lower layer, the effect of lubricant storing can be also obtained. As carbon black, furnace carbon black for rubber, thermal carbon black for rubber, carbon black for color, acetylene black, etc., can be used.

The carbon black for the lower layer shall optimize the following characteristics according to the desired effects and also by using plural kinds of carbon blacks together, more excellent effects are sometimes obtained.

The specific surface area of the carbon black for the lower layer is from 100 to 500 m$^2$/g, and preferably from 150 to 400 m$^2$/g and the DBP oil absorption thereof is from 20 to 400 ml/100 g, and preferably from 30 to 200 ml/100 g. The particle sizes of the carbon black are from 5 mμ to 80 mμ, preferably from 10 mμ to 50 mμ, and more preferably from 10 mμ to 40 mμ. Also, it is preferred that pH of the carbon black is from 2 to 10, the water content is from 0.1 to 10%, and the tapping density is from 0.1 to 1 g/ml.

Concrete examples of the carbon black which is used in the present invention, include BLACKPEARLS 2000, 1300, 1000, 900, 800, 880, and 700, and VULCAN XC-72 (trade names, made by Cabot Corporation); #3050B, #3150B, #3250B, #3750B, #3950B, #950, #650B, #970B, #850B, MA-600. MA-230, #4000, and #4010 (trade names, made by Mitsubishi Chemical Corporation); and CONDUCTEX SC, RAVEN 8800, 8000, 7000, 5750, 5250, 3500, 2100, 2000, 1800, 1500, 1255, and 1250 (trade names, made by Columbia Carbon Co., Ltd.); and Ketjen Black EC (trade name, made by Akzo Co., Ltd.).

Carbon black surface-treated with a dispersing agent, carbon black grafted with a resin, or carbon black a part of the surface of which is graphitized may be used. Also, the carbon black may be dispersed with binders before adding to the coating composition.

The carbon black can be used in an amount of the range of not more than 50% of the non-magnetic inorganic powder or the range of not more than 40% of the total amount of the non-magnetic layer.

These carbon blacks can be used singly or as a combination of them. About the carbon black which can be used in this invention, the descriptions in, for example, *Carbon Black Binran* (*Handbook*), edited by Carbon Black Society can be referred to.

Also, according to the purposes, an organic powder can be added to the undercoating layer. Examples of the organic powder include an acrylstyrene series resin powder, a benzoguanamine resin powder, a melamine series resin powder, a phthalocyanine series pigment powder, a polyolefin series resin powder, a polyester series powder, a polyamide resin powder, a polyimide resin powder, a polyethylene fluoride resin powder, etc. The production methods thereof are described in JP-A-62-18564 and JP-A-60-255827.

As the binder resins, the lubricants, the dispersing agents, the additives, the solvents, the dispersing methods, etc., for the undercoating layer, those for the magnetic layer described below can be used. In particular, in regard to the amount and the kind of the binder resin, and the amounts and the kinds of the additives and the dispersing agent, the well-known techniques regarding the magnetic layer can be applied.

[Binder]

As the binder resins, the lubricants, the dispersing agents, the additives, the solvents, the dispersing methods, etc., for the non-magnetic layer in the present invention, those for the magnetic layer described below can be used. In particular, in regard to the amount and the kind of the binder resin, and the amounts and the kinds of the additives and the dispersing agent, the well-known techniques regarding the magnetic layer can be applied.

As the binders which are used in the present invention, conventionally-known thermoplastic resins, thermo-setting resins, reaction-type resins and mixtures of them are used.

In the thermoplastic resins for use in this invention, the glass transition temperature is from $-100$ to $150°$ C., the number average molecular weight is from 1,000 to 200,000, and preferably from 10,000 to 100,000, and the polymerization degree is from about 50 to 1,000.

Examples of the resins include polymers or copolymers containing vinyl chloride, vinyl acetate, vinyl alcohol, maleic acid, acrylic acid, acrylic acid esters, vinylidene chloride, acrylonitrile, methacrylic acid, methacrylic acid esters, styrene, butadiene, ethylene, vinyl butyral, vinyl acetal, vinyl ether, etc., as the constitutional unit(s), a polyurethane resin, and various kinds of rubber series resins.

Also, examples of the thermosetting resins and reaction-type resins include phenol resins, epoxy resins, polyurethane curing-type resins, urea resins, melamine resins, alkyd resins, acrylic reactive resins, formaldehyde resins, silicone resins, epoxy-polyamide resins, a mixture of a polyester resin and an isocyanate prepolymer, a mixture of polyester polyol and polyisocyanate, and a mixture of polyurethane and poyisocyanate. These resins are described in detail in *Plastic Handbook*, published by Asakura Shoten.

Also, a well-known electron ray curing-type resin can be used for each layer. The examples and the production method of the resin are described in detail in JP-A-62-256219.

These resins described above can be used singly or as a combination of them. As a preferred combination, there are a combination of a polyurethane resin and at least one kind selected from the group consisting of a vinyl chloride resin, a vinyl chloride-vinyl acetate copolymer, a vinyl chloride-vinyl acetate-vinyl alcohol copolymer, and a vinyl chloride-vinyl acetate-maleic anhydride copolymer and the foregoing combination further added with polyisocyanate.

For constituting the polyurethane resin, well-known materials such as polyester polyurethane, polyether polyurethane, polyetherpolyester poyurethane, polycarbonate polyurethane, polyesterpolycarbonate polyurethane, polycaprolactone polyurethane, etc., can be used.

For obtaining the more excellent dispersibility and durability in all the binders described above, it is preferred to use the foregoing binders each having introduced therein by copolymerization or addition reaction at least one polar group selected from the group consisting of —COOM, —SO$_3$M, —OSO$_3$M, —P=O(OM)$_2$, —O—P=O(OM)$_2$ (wherein M represents a hydrogen atom or an alkaline metal base), —OH, —NR$_2$, —N$^+$R$_3$ (wherein R represents a hydrocarbon group), an epoxy group, —SH, —CN, etc. The amount of the polar group is from $10^{-1}$ to $10^{-8}$ mol/g, and preferably from $10^{-2}$ to $10^{-6}$ mol/g.

Concrete examples of the binders which can be used in the present invention include VAGH, VYHH, VMCH, VAGF, VAGD, VROH, VYES, VYNC, VNCC, XYHL, XYSG, PKHH, PKHJ, PKHC, and PKFE (trade names, made by Union Carbide Corporation), MPR-TA, MPR-TA5, MPR-TAL, MPR-TSN, MPR-TMF, MPR-TS, MPR-TM, and MPR-TAO (trade names, made by Nissin Kagaku Kogyo K.K.), 1000W, DX80, DX-81, DX-82, DX-83, and 100FD (trade names, made by DENKI KAGAKU KOGYO K.K.), MR-104, MR-105, MR110, MR100, MR555, and 400X-110 (trade names, made by Nippon Zeon Co., Ltd.), Nippollan, N2301, N2302, and N2304 (trade names, made by NIPPON POLYURETHANE CO., LTD.), Pandex T-5105, T-R3080, T-5201, Burnock D-400, D-210-80, Crisvon 6109 and 7209 (trade names, made by DAINIPPON INK AND CHEMICALS, INC.), VYLON UR8200, UR8300, UR8700, RV530, and RV280 (trade names, made by TOYOBO CO., LTD.), Daipheramine 4020, 5020, 5100, 5300, 9020, 9022, and 7020 (trade names, made by DAINICHISEIKA CO., LTD.), MX5004 (trade name, made by Mitsubishi Chemical Corporation), Sunprene SP-150 (trade name, made by SANYO CHEMICAL INDUSTRIES CO., LTD.), and Salan F310 and F210 (trade names, made by Asahi Chemical Industry Co., Ltd.).

The binder which is used for the non-magnetic layer and the magnetic layer in the present invention is used in the range of from 5 to 50%, and preferably from 10 to 30% based on the amount of the non-magnetic inorganic powder or the magnetic powder. It is preferred that in the case of using the vinyl chloride resin, the amount is from 5 to 30%, in the case of using the polyurethane resin, the amount is from 2 to 20%, and polyisocyanate is used as a combination of these resins in the range of from 2 to 20%. However, for example, when a corrosion of a magnetic head occurs by a slight amount of dechlorination, the polyurethane resin only or the combination of the polyurethane resin and polyisocyanate only can be used.

In the present invention, in the case of using the polyurethane resin, it is preferred that the glass transition temperature thereof is from $-50$ to $150°$ C., the breaking elongation is from 100 to 2,000%, the breaking stress is 0.05 to 10 kg/cm$^2$. and the yield point is from 0.05 to 10 kg/cm$^2$.

The magnetic recording medium of the present invention has two or more layers. Accordingly, the amount of the binder, the amounts of the vinyl chloride resin, the polyurethane resin, polyisocyanate, and other resin(s) in the binder, the molecular weight and the amount of the polar group of each resin forming each magnetic layer, and the physical properties of the resins described above can, if necessary, change between the non-magnetic layer and each magnetic layer as a matter of course, or they shall be rather optimized in each layer, and well-known techniques regarding multilayer-type magnetic layer can be applied. For example, when the amount of the binder is changed in each layer, it is effective for reducing the occurrence of scratches on the surface of the magnetic layer to increase the amount of the binder for the magnetic layer and also for improving the head touch to a magnetic head, the amount of the binder of the non-magnetic layer is increased to impart a softness to the layer.

As the polyisocyanate which is used in this invention, isocyanates such as tolylene diisocyanate, 4,4'-diphenylmethane diisocyanate, hexamethylene diisocyanate, xylylene diisocyanate, naphthylene-1,5-diisocyanate, o-toluidine diisocyanate, isophoron diisocyanate, triphenylmethane triisocyanate, etc.; the reaction products of these isocyanates and polyalcohol; and a polyisocyanate formed by condensation of the isocyanates can be used.

As the trade names of the commercially available isocyanates, there are Coronate L, Coronate HL, Coronate 2030, Coronate 2031, Millionate MR, and Millionate MTL (made by NIPPON POLYURETHANE CO., LTD.); Takenate D-102, Takenate D-110N, Takenate D-200, and Takanate D-202 (made by Takeda Chemical Industries, Ltd.); and Desmodur L. Desmodur IL, Desmodur N, and Desmodur HL (made by Sumitomo Bayer Co.) and they can be used singly or as a combination of two or more kinds of them by utilizing the difference in the curing reactivities.

[Carbon Black, Abrasives]

As the carbon black which is used for the magnetic layer(s) in the present invention, a furnace black for rubber, a thermal black for rubber, a carbon black for color, acetylene black, etc., can be used.

It is preferred that the specific area of the carbon black is from 5 to 500 $m^2/g$, the DBP oil absorption thereof is from 10 to 400 ml/100 g, the particle sizes are 5 m$\mu$ to 300 m$\mu$, pH is from 2 to 10, the water content is from 0.1 to 10%, and the tapping density is from 0.1 to 1 g/ml.

Concrete examples of the carbon black for use in the present invention include BLACKPEARLS 2000, 1300, 1000, 900, 905, 800, and 700, VULCAN XC-72 (trade names, may by Cabot Corporation); #80, #60, #55, #50, and #35 (trade name, made by Asahi Carbon K.K.); #2400B, #2300, #900, #1000, #30, #40, and #10B (trade names, made by Mitsubishi Chemical Corporation); and CONDUCTEX SC, RAVEN 150, 50, 40, and 15, RAVEN-MT-P (Columbia Carbon Co., Ltd.); and Ketjen Black EC (trade name, made by Nippon EC K.K.).

The carbon black may be surface-treated with a dispersing agent or grafted with a resin, or the carbon black a part of the surface of which is graphitized may be used. Also, the carbon black may be previously dispersed in the binder before adding to a magnetic coating composition.

These carbon blacks may be used singly or as a combination of them. When the carbon black is used, the amount thereof is preferably from 0.1 to 30% based on the magnetic powder in the magnetic layer.

The carbon black has functions of a static prevention, reducing the coefficient of friction, imparting a light-shielding property, improving the film strength, etc., and these functions differ according to the carbon black used. Therefore, it is as a matter of course possible to change the kind, the amount, and the combination of the carbon blacks for use in the present invention between the upper magnetic layer and the lower non-magnetic layer and selectively use that carbon blacks according to the purposes based on the properties such as the particle sizes, the oil absorption, the electric conductivity, pH, etc., described above. Rather, these properties of the carbon black must be optimized in each layer.

With respect to the carbon blacks which can be used for the magnetic layer in the present invention, the descriptions of, for example, *Carbon Black Binran* (*Handbook*), edited by Carbon Black Society can be referred to.

As the abrasives for use in the present invention, well-known materials mainly having a Mohs' hardness of at least 6, such as $\alpha$-alumina having an $\alpha$-conversion of at least 90%, $\beta$-alumina, silicon carbide, chromium oxide, cerium oxide, $\alpha$-iron oxide, corundum, artificial diamond, silicon carbide, silicon carbide titanium carbide, titanium oxide, silicon dioxide, boron nitride, etc., can be used singly or as a combination thereof. Also, the composite material of these abrasives (an abrasive surface-treated with other abrasive) may be used.

The abrasive contains, as the case may be, other compound or element than the main component but when the content of the main component is 90% or more, the effect of the abrasive is not changed. The particle sizes of these abrasives are preferably from 0.01 to 2 $\mu$m and in particular, for enhancing the electromagnetic characteristics, it is preferred that the particle size distribution is narrow. Also, for improving the durability, if necessary, abrasives each having a different particle size are combined and even in the case of a single adhesive, by widening the particle size distribution, the same effect can be obtained. It is preferred that the tapping density of the abrasive(s) is from 0.3 to 2 g/ml, the water content is from 0.1 to 5%, pH is from 2 to 11, and the specific area is from 1 to 30 $m^2/g$.

The form of the abrasive for use in the present invention may be an acicular form, a spherical form, or a die form but an abrasive having a corner at a part of the form is preferred since the abrasive property is high.

Concrete examples of the abrasives for use in this invention include AKP-12, AKP-15, AKP-20, AKP-30, AKP-50, HIT-20, HIT-30, HIT-55, HIT-60, HIT-70, HIT-80, and HIT-100 (trade names, made by Sumitomo Chemical Company, Limited); ERC-DBM, HP-DBM, and HPS-DBM (trade names, made by Reynolds Corporation); WA10000 (trade name, made by Fujimi Kenmazai K.K.); UB20 (trade name, made by Murakami Kogyo K.K.); G-5, Kuromex U2, and Kuromex U1 (trade names, made by The Nippon Chemical Industries Co., Ltd.); TF100 and TF140 (trade name, made by TODA KOGYO CO., LTD.); $\beta$-Random ultrafine (trade name, made by IBIDEN CO., LTD.); and B-3 (trade name, made by Showa Kogyo K.K.). The abrasive can be, if necessary, added to the non-magnetic layer. By adding the abrasive to the non-magnetic layer, the surface form can be controlled and the projecting state of the abrasive can be controlled. The particle sizes and the amount of the abrasives to be added to the magnetic layer and the non-magnetic layer must be, as a matter of course, selected for-the optimum values.

[Additives]

As the additives which are used for the magnetic layer(s) and the non-magnetic layer in the present invention, materials having a lubricating effect, an antistatic effect, a dispersing effect, a plasticizing effect, etc., are used.

Examples of the additives include molybdenum disulfite, tungsten disulfite graphite, boron nitride, fluorinated graphite, a silicone oil, a silicone having a polar group, a fatty acid-modified silicone, fluorine-containing silicone, fluorine-containing alcohols, fluorine-containing esters, polyolefins, polyglycols, alkylphosphoric acid esters and the alkali metal salts thereof, alkylsulfuric acid esters and the alkali metal salts thereof, monobasic fatty acids having from 10 to 24 carbon atoms (the fatty acid may contain an unsaturated bond or may be branched) and the metal (e.g., Li, Na, K, Cu, etc.) salts thereof, monohydric, dihydric, trihydric, tetrahydric, pentahydric, and hexahydric alcohols having from 12 to 22 carbon atoms (the alcohol may contain an unsaturated bond or may be branched), alkoxyalcohols having from 12 to 22 carbon atoms, monofatty acid esters, difatty acid esters, or trifatty acid esters composed of monobasic fatty acids having from 10 to 24 carbon atoms (the fatty acid may have an unsaturated bond or may be branched) and monohydric, dihydric, trihydric, tetrahydric, pentahydric, or hexahydric alcohols having from 2 to 12 carbon atoms, fatty acid esters of the monoalkyl ether of an alkylene oxide polymer, fatty acid amides having from 8 to 22 carbon atoms, fatty acid amines having from 8 to 22 carbon atoms, etc.

Concrete examples of them are as follows.

As the fatty acids, there are capric acid, caproic acid, lauric acid, myristic acid, palmitic acid, stearic acid, behenic acid, oleic acid, elaidic acid, linolic acid, linolenic acid, isostearic acid, etc.

As the esters, there are butyl stearate, octyl stearate, amyl stearate, isooctyl stearate, butyl myristate, octyl myristate, butoxyethyl stearate, butoxydiethyl stearate, 2-ethylhexyl stearate, 2-octyldodecyl palmitate, 2-hexyldodecyl palmitate, isohexadecyl stearate, oleyl oleate, dodecyl stearate, tridecyl stearate, etc.

As the alcohols, there are oleyl alcohol, stearyl alcohol, lauryl alcohol, etc.

Also, nonionic surface active agents such as alkylene oxide series surface active agents, glycerol series surface active agents, glycidol series surface active agents, alkylphenol ethylene oxide addition products, etc.; cationic surface active agents such as cyclic amines, ester amides, quaternary ammonium salts, hydantoin derivatives, heterocyclic rings, phosphoniums, sulphoniums, etc.; anionic surface active agents containing an acidic group such as a carboxylic acid, sulfonic acid, phosphonic acid, a sulfuric acid group, a phosphoric acid ester group, etc.; and amphoteric surface active agents such as amino acids, aminosulfonic acids, the sulfuric acid or phosphoric acid esters of amino alcohol; alkylbetaines, etc., can be used. These surface active agents are described in detail in *Kaimen Kasseizai Binran* (*Surface Active Agent Handbook*) published by Sangyo Tosho K.K.

These lubricants and antistatic agents, etc., are not always 100 purity and may contain impurities such as isomers, unreacted materials, side-reaction products, decomposition products, oxides, etc., in addition to the main component. The content of these impurities is preferably 30% or lower and more preferably 10% or lower.

These lubricants, surface active agents, etc., for use in the present invention each has a different physical action and the kind, the amount, and the using ratio of a lubricant together for obtaining a synergistic effect must be most suitably determined according to the purposes. It is considered to control oozing on the surfaces by using fatty acids each having a different melting point for the non-magnetic layer and the magnetic layer, control oozing on the surfaces by using esters each having a different boiling point for the non-magnetic layer and the magnetic layer, melting point, or polarity, improve the stability of coating by controlling the amount of the surface active agent used, improve the lubricating effect by increasing the addition amount of the lubricant in the interlayer, etc., although, as a matter of course, the invention is not limited to the cases illustrated above.

In general, the total amount of the lubricant is selected in the range of from 0.1% to 50%, and preferably from 2% to 25% based on the hexagonal ferrite or the non-magnetic powder.

All or a part of the additives which are used in this invention may be added in any step of producing the magnetic coating composition or the non-magnetic coating composition. For example, there are the case that the additives are mixed with the hexagonal ferrite before the kneading step, the case that the additives are added in the kneading step of the hexagonal ferrite and the binder by a solvent, the case that the additives are added at dispersing step, the case that the additives are added after dispersing, the case that the additives are added immediately before coating, etc. Also, there is a case that according to the purposes, after coating the magnetic layer, by coating a part or all of the additives by a simultaneous coating or a successive coating, the purposes are attained. Also, according to the purposes, after calendering or after slitting, a lubricant can be coated on the surface of the magnetic layer.

[Solvent]

Examples of the organic solvent for use in the present invention include ketones such as acetone, methyl ethyl ketone, methyl isobutyl ketone, diisobutyl ketone, cyclohexanone, isophorone, tetrahydrofuran, etc.; alcohols such as methanol, ethanol, propanol, butanol, isobutyl alcohol, isopropyl alcohol, methyl cyclohexanol, etc.; esters such as methyl acetate, butyl acetate, isobutyl acetate, isopropyl acetate, ethyl lactate, glycol acetate, etc.; glycol ethers such as glycol dimethyl ether, glycol monoethyl ether, dioxane, etc.; aromatic hydrocarbons such as benzene, toluene, xylene, cresol, chlorobenzene, etc.; chlorinated hydrocarbons such as methylene chloride, ethylene chloride, carbon tetrachloride, chloroform, ethylene chlorohydrin, dichlorobenzene, etc.; N,N-dimethylformamide, hexane, etc.

The organic solvent can be used at an optional ratio.

These organic solvents are not always 100% pure and the organic solvent may contain impurities such as isomers, unreacted materials, side-reaction product, decomposition products, oxides, water, etc., in addition to the main component. The content of these impurities is preferably 30% or lower, and more preferably 10% or lower. The organic solvent for use in this invention may be same kind for the magnetic layer and the non-magnetic layer but it is preferred to use an organic solvent having a high surface tension (such as cyclohexanone, dioxane, etc.) for the non-magnetic layer to increase the stability of coating. Practically, it is important that the arithmetic average value of the surface tension of the solvent composition for the upper layer is not lower than the arithmetic average value of the surface tension of the solvent composition for the lower layer. For improving the dispersibility, it is preferred that the polarity of the solvent is strong to some extent and it is preferred that the solvent composition contains a solvent having a dielectric constant of at least 15, in an amount of 50% or more. Also the solubility parameter is preferably from 8 to 11.

[Layer Constitution]

In the thickness construction of the magnetic recording medium of the present invention, the thickness of the non-magnetic support is from 2 to 100 $\mu$m, and preferably from 10 to 80 $\mu$m. A subbing layer may be formed on the non-magnetic support for improving the adhesion of the non-magnetic support and the non-magnetic layer. The thickness of the subbing layer is from 0.01 to 2 $\mu$m, and preferably from 0.02 to 0.5 $\mu$m.

The magnetic recording medium of the present invention is a magnetic recording medium having formed the non-magnetic layer and the magnetic layer on both the surfaces thereof or one surface thereof and is preferably a disk-form magnetic recording medium having formed the layers on both the surfaces thereof. When the magnetic layer is formed on one surface of a support, for giving the effects of a static prevention and a curling correction, a back coating layer may be formed on the opposite side of the support to the side having the non-magnetic layer and the magnetic layer. The thickness of the back coating layer is from 0.1 to 4 μm and preferably from 0.3 to 2.0 μm. As the subbing layer and the back coating layer, well-known layers can be used.

The magnetic layer in the present invention, has, if desired, a magnetic layer having a different magnetic characteristics besides the magnetic layer having the thickness X described above and the construction regarding the well-known multilayer-type magnetic layer can be applied.

The thickness of the non-magnetic layer which is the undercoating layer of the magnetic recording medium of the present invention is from 0.2 μm to 5.0 μm, preferably from 0.5 μm to 3.0 μm, and more preferably from 1.0 μm to 2.5 μm. In addition, when the undercoating layer of the magnetic recording medium of the present invention is substantially a non-magnetic layer, the undercoating layer gives the effect thereof and even when the undercoating layer intentionally contains a small amount of a magnetic powder as an impurity, the undercoating layer gives the effect of this invention and thus even when the magnetic recording medium has such an undercoating layer, the layer constitution is as a matter of course regarded as substantially same constitution of the present invention. In this case, the term "substantially a non-magnetic layer" means that the residual magnetic flux density of the undercoating layer is 100 G or less or the coercive force thereof is 100 Oe or less, and preferably means that the undercoating layer does not have a residual magnetic flux density and a coercive force.

[Non-magnetic Support]

As the non-magnetic support for use in the present invention, well-known films such as polyesters (e.g., polyethylene terepthalate and polyethylene terenaphthalate), polyolefins, cellulose triacetate, polycarbonate, polyamide, polyimide, polyamidoimide, polysulfone, polyaramide, aromatic polyamide, polybenzoxazole, etc., can be used. In these materials, a high-strength support such as polyethylene naphthalate, polyamide, etc., is preferably used. Also, if necessary, for changing the surface roughness of the magnetic layer surface and the base surface, the laminated layer-type support as described in JP-A-3-224127 can be used. Onto these support, a corona discharging treatment, a plasma treatment, an adhesion-facilitating treatment, a heat treatment, a dust removing treatment, etc., may be previously applied. Also, as the support in the present invention, an alumina base plate or a glass base plate can be used.

For attaining the purposes of the present invention, it is necessary to use the non-magnetic support that the central plane average surface roughness SRa measured by a mirau method of TOPO-3D (manufactured by WYKO Co.) is 20 mm or lower, preferably 10 mm or lower, and more preferably 5 mm or lower. It is preferred that the non-magnetic support not only has a low central plane average surface roughness but also does not have large projections of 0.5 μm or larger. Also, the surface roughness form is, if necessary, freely controlled by the sizes and the amount of a filler added to the support. As examples of the filler, there are the oxides and the carbonates of Ca, Si, Ti, etc., and organic fine powders such as an acrylic resin powder, etc. It is preferred that the maximum height SRmax of the support is 1 μm or lower, the ten-points average roughness SRz is 0.5 μm or lower, the central plane hill height SRp is 0.5 μm or lower, the central plane valley depth SRv is 0.5 μm or lower, the central plane area ratio SSr is from 10% to 90%, and the average wavelength S$\lambda$a is from 5 μm to 300 μm. Also, for obtaining the desired electromagnetic characteristics and durability, the surface projection distribution of the support can be optionally controlled with a filler and the number of the projections having the size of from 0.01 μm to 1 μm can be controlled in the range of 0 to 2,000/0.1 mm$^2$.

The F-5 value of the non-magnetic support which is used in the present invention is preferably from 5 to 50 kg/mm$^2$, the heat shrinkage of the support at 100° C. for 30 minutes is preferably 3% or lower, and more preferably 1.5% or lower, and the heat shrinkage thereof at 80° C. for 30 minutes is preferably 1% or lower, and more preferably 0.5% or lower. It is also preferred that the breaking strength of the support is from 5 to 10 kg/mm$^2$ and the elastic modulus thereof is from 100 to 2,000 kg/mm$^2$. The temperature expansion coefficient thereof is from $10^{-4}$ to $10^{-8}$/° C., and preferably from $10^{-5}$ to $10^{-6}$/° C. Also the humidity expansion coefficient thereof is $10^{-4}$/RH% or lower, and preferably $10^{-5}$/RH% or lower. It is preferred that these heat characteristics, dimensional characteristics, and mechanical strength characteristics are almost same with a difference within 10% in each direction in the plane of the support.

[Production Method]

The step of producing the magnetic coating composition and the non-magnetic coating composition for the magnetic recording medium of the present invention includes at least a kneading step, a dispersing step, and a mixing step formed before or after these steps according to the necessity. Each step described above may be composed of 2 or more stages. All the raw materials for use in the present invention, such as the hexagonal ferrite, the non-magnetic powder, the binder, carbon black, the abrasive, the antistatic agent, the lubricant, the solvent, etc., may be added in any step at the beginning of the step or during the step. Also, each raw material may be split into plural portions and may be partially added in 2 or more steps. For example, polyurethane component is split into several portions and each portion may be added to the kneading step, the dispersing step, and a mixing step for controlling the viscosity after dispersion.

For attaining the object of the present invention, a conventionally known production technique may be used as a part of the steps in the present invention. In the kneading step, an open kneader, a continuous kneader, a pressure kneader, an extruder, etc., having a strong kneading power is preferably used. In the case of using a kneader, the hexagonal ferrite or the non-magnetic powder and all or a part (preferably 30% or more of a whole binder) of a binder, for example, 100 parts of the hexagonal ferrite and from 5 to 500 parts of the binder are subjected to a kneading treatment. The details of the kneading treatment are described in JP-A-1-106338 and JP-A-1-79274. Also, for dispersing the coating composition for the magnetic layer or the non-magnetic layer, glass beads can be used but zirconia beads, titania beads, or steel beads, which are a dispersing media of a high specific gravity are suitably used. The particle sizes and the packing ratio of the dispersion media are used in the optimized conditions. In this case, a well-known dispersing means can be used.

When the magnetic recording medium of a multilayer structure of the present invention is produced, it is preferred to use the following coating systems.

That is, there are a method of first coating the undercoating layer on the support by a gravure coating apparatus, a roll coating apparatus, a blade coating apparatus, an extrusion coating apparatus, which is generally used for forming a magnetic coating composition, and while the undercoating layer is in a wet state, coating the upper layer (the magnetic layer) by the support pressing-type extrusion coating apparatus disclosed in JP-B-1-46186 (the term "JP-B" as used herein means an "examined Japanese patent publication"), JP-A-60-238179, and JP-A-2-265672, a method of almost simultaneously coating the lower layer and the upper layer by one coating head having 2 coating composition passing slits as disclosed in JP-A-63-88080, JP-A-2-17971, and JP-A-2-265672, and a method of almost simultaneously coating the lower layer and the upper layer by a back up roll-equipped extrusion coating apparatus disclosed in JP-A-2-174965.

In addition, for preventing lowering the electromagnetic characteristics, etc., of the magnetic recording medium by the aggregation of magnetic particles, it is desirable to apply shearing to the coating compositions in the inside of the coating head as disclosed in JP-A-62-95174 and JP-A-1-236968. Furthermore, it is necessary that the viscosity of each coating composition satisfies the numeral range described in JP-A-3-8471.

For realizing the constitution of the layer structure in the present invention, a successive multiple layer coating method of coating the undercoating layer followed by drying and forming thereon the magnetic layer may be used without losing the effect of this invention. However, for reducing the coating defect and improving the quality such as the prevention of the occurrence of drop out, the use of the simultaneous multilayer coating method described above is preferred.

In the present invention, the magnetic recording medium may not be oriented without using an orientation apparatus, or a well-known random orientation apparatus wherein cobalt magnets are obliquely alternately disposed or wherein an alternate current fields are applied by a solenoid can be used but particularly preferably, by perpendicularly orienting using a well-known method such as a different pole opposing magnet, etc., isotropic magnetic characteristics are imparted to the circumference direction. In the case of carrying out particularly high-density recording, a perpendicular orientation is preferred.

It is preferred that the drying position of the coated layer can be controlled by controlling the temperature of the drying blast, the amount of the blast, and the coating speed. The coating speed is preferably from 20 meters/minute to 1,000 meters/minute and the temperature of the drying blast is preferably 60° C. or higher. Also, before entering the magnet zone, the coated layers can be subjected to a proper pre-drying.

For the treatment with calender rolls, the coated layers are treated with the rolls of a plastic having a heat resistance, such as an epoxy resin, a polyimide resin, a polyamide resin, a polyimidoamide resin, etc., or with metal rolls but in particular, when the magnetic layer are formed on both surfaces of a non-magnetic support, it is preferred to treat with metal rolls each other. The treatment temperature is preferably 50° C. or higher and more preferably 100° C. or higher. The linear pressure is preferably 200 kg/cm or higher, and more preferably 300 kg/cm or higher.

[Physical Characteristics]

The friction coefficient of the magnetic recording medium of the present invention to a magnetic head is 0.5 or lower, and preferably 0.3 or lower in the ranges of a temperature of from −10 to 40° C. and a humidity of 0 to 95%, the surface specific resistance is preferably from $10^4$ to $10^{12}$ Ω/sq for the magnetic surface, and the static potential is preferably from −500 volts to +500 volts. The modulus of elasticity of the magnetic layer at the 0.5% elongation is preferably from 100 to 2,000 kg/mm$^2$ in each direction in the plane (an optional direction in the plane), the breaking strength is preferably from 1 to 30 kg/cm$^2$, the modulus of elasticity of the magnetic recording medium is preferably from 100 to 1,500 kg/mm$^2$ in each direction in the pane, the residual elongation is preferably 0.5% or lower, and the heat shrinkage at all the temperatures of 100° C. or less is preferably 1% or lower, more preferably 0.5% of lower, and most preferably 0.1% or lower. The glass transition temperature (the maximum point of the loss elastic coefficient of the dynamic viscosity measurement measured at 110 Hz) of the magnetic layer is preferably from 50 to 120° C. and that of the lower non-magnetic layer is preferably from 0 to 100° C. The loss elastic coefficient is preferably in the range of from $1×10^8$ to $8×10^9$ dyne/cm$^2$ and the loss tangent is preferably 0.2 or lower. When the loss tangent is too large, adhesion troubles are liable to occur. It is preferred that the thermal characteristic and the mechanical characteristics are almost same within 10% in each direction in the plane. The content of the residual solvent contained in the magnetic layer is preferably 100 mg/m$^2$ or less, and more preferably 10 mg/m$^2$ or less. The voids of the coated layers is preferably 30 volume % or less, and more preferably 20 volume % or less in both the non-magnetic layer and the magnetic layer. The voids is preferably as small as possible for obtaining high output but as the case may be, it is better to ensure a some value of voids according to the purposes. For example, in the disk medium, wherein the repeated use is important, larger voids is preferred for the running durability.

The central plane surface roughness SRa of the magnetic layer measured by a mirau method of TOPO-3D is 10 nm or less, preferably 5 nm or less, and more preferably 3 nm or less but the RMS surface roughness $R_{RMS}$ obtained in the evaluation by AFM is preferably in the range of from 2 nm to 15 nm. Also, it is preferred that the maximum height SRmax of the magnetic layer is 0.5 μm or less, the tem point average roughness SRz is 0.3 μm or less, the central plane hill height SRp is 0.3 μm or less, the central plane valley depth SRv is 0.3 μm or less, the central plane area ratio SSr is from 20 to 80%, and the average wavelength Sλa is from 5 to 300 μm.

It is preferred that with respect to the surface projections of the magnetic layer, the projections having the size of from 0.01 to 1 μm are optionally formed in the range of from 0 to 2,000 to optimize the coefficient of friction. These can be easily controlled by the control of the surface property with the filler of the support, the particle sizes and the amount of the powder to be added to the magnetic layer, the roll surface form of the calendering treatment, etc. It is also preferred that curling is within ±3 mm.

It can be easily assumed that in the present invention, these physical characteristics can be changed between the non-magnetic layer and the magnetic layer according to the purposes. For example, by increasing the coefficient of elasticity of the magnetic layer, the running durability is improved and by lowering the coefficient of elasticity of the non-magnetic layer as compared with that of the magnetic layer, attaching the magnetic recording medium to a magnetic head is improved, etc.

EXAMPLE

Then, the following examples are intended to illustrate the present invention but not to limit the invention in any way. In all the Examples, all parts are by weight.

Magnetic Coating Composition X:

Barium ferrite magnetic powder     100 parts
Composition mol ratio to Ba: Fe 9.10%, Co -continued

| | |
|---|---|
| 0.30%, Zn 0.57% Hc: 2200 Oe, specific area: 55 $m^2/g$, σs: 62 emu/g, tabular diameter: 30 mm, tabular ratio: 3.5 | |
| Vinyl chloride copolymer (containing —$SO_3K$) MR110 (made y Nippon Zeon Co., Ltd.) | 8 parts |
| Polyurethane (containing —$SO_3Na$) UR8200 (made by TOYOBO CO., LTD.) | 3 parts |
| α-Alumina (mean particle size 0.2 μm): HIT55 (made y Sumitomo Chemical Industries Co.) | 10 parts |
| Carbon Black (mean particle size 80 nm): #50 (Asahi Carbon K.K) | 5 parts |
| Butyl stearate | 10 parts |
| Butoxyethl stearate | 5 parts |
| Isohexadecyl stearate | 3 parts |
| Stearic acid | 2 parts |
| Methyl ethyl ketone | 125 parts |
| Cyclohexanone | 125 parts |
| Non-Magnetic Coating Composition Y: | |
| Non-magnetic powder $TiO_2$ Crystal series rutile mean primary particle size: 0.030 μm, specific surface area by BET method: 50 $m^2/g$, pH 7.0, $TiO_2$ content: at least 90%, DBP oil absorption: 27 to 38 g/100 g, surface treating agent: $Al_2O_3$, 8% by weight | 80 parts |
| CONDUCTEX SC-U (made by Columbia Carbon Co., Ltd.) (mean particle size: 20 nm) | 20 parts |
| Vinyl chloride copolymer (containing —$SO_3K$) MR110 (made by Nippon Zeon Co., Ltd.) | 15 parts |
| Polyurethane (containing —$SO_3Na$) UR8300 (made by TOYOBO CO., LTD.) | 5 parts |
| Butyl stearate | 10 parts |
| Butoxyethyl stearate | 5 parts |
| Isohexadecyl stearate | 2 parts |
| Stearic acid | 3 parts |
| Methyl ethyl ketone/cyclohexanone (8/2 mixed solvent) | 250 parts |

[Preparation of Magnetic Recording Medium]

In each of the two coating compositions described above, the components were kneaded by a kneader and thereafter dispersed using a sand mill. Then, 10 parts of polyisocyanate were added to each of the coating compositions for the non-magnetic layer and the magnetic layer and after further adding 40 parts of butyl acetate to each of the coating compositions, each coating composition was filtered using a filter having pores of an average pore size of 1 μm to provide the coating compositions for forming the non-magnetic layer and forming the magnetic layer.

The coating composition for the non-magnetic layer obtained and the coating composition for the magnetic layer were simultaneously coated on a polyethylene phthalate support having a thickness of 62 μm and a central line surface roughness of 0.004 μm such that the dry thickness of the non-magnetic layer became 1.5 μm and the dry thickness of the magnetic layer became 0.2 μm, and when both the layers were in a wet state, a perpendicular orientation was applied thereto by a different pole opposing Co magnet of 5,000 G. Thereafter, the coated support was treated by a 7-stage calender at a temperature of 90° C. and a linear pressure of 300 kg/cm, the magnetic recording medium thus prepared was punched to form a disk having a diameter of 3.7 inches, after subjecting a surface abrasion treatment, the disk was placed in a cartridge of 3.7 inches (Zip-disk cartridge, made by Lomega Co.) having a liner at the inside walls thereof, and definite parts were equipped to provide a 3.7 inch floppy disk. The sample was defined as A-2.

Furthermore, samples A-1, A-3 to A-10, and B-1 to B-10 were prepared by changing the thickness of the magnetic layer to in the range of from 0.1 μm to 0.7 μm. In addition, in Sample B-2 only, a non-magnetic layer was not formed and the magnetic layer only was coated on the support.

In this case, "A-" means the samples of the examples of the present invention and "B-" means the samples of the comparative examples.

[Evaluation]

To each of the samples were recorded the signal of the definite minimum bit interval Y and the signal of the maximum bit interval Z and each output was observed as the HF output (the output of the shortest wavelength) or as the LF output (the output of the longest wavelength). Also, the wave form of the LF output was observed, the form of a single peak pulse was evaluated as G, the form of almost single peal pulse was M, and the form having a tendency of die pulse and bad symmetry B.

Furthermore, to each of Samples A-1 to A-6, B-1, B-2, and B-8 to B-10 was recorded an MFM modulation (Z/Y=2), to each of Samples A-7 to A-10 and B-3 to B-7 was recorded a 2-7RLLC modulation (Z/Y=8/3), and an error rate was measured.

These characteristics are shown in Table 1.

TABLE 1

| Sample No. | Magnetic Layer Thickness X (μm) | Hcp (Oe) | SQp | Y (μm) | HF Output (μV) | Z (μm) | LF Output (μV) | Wave Form | Error Rate | Remarks |
|---|---|---|---|---|---|---|---|---|---|---|
| A-1 | 0.1 | 2200 | 0.81 | 0.5 | 0.42 | 1 | 0.67 | M | $8.0 \times 10^{-7}$ | Invention |
| A-2 | 0.2 | 2200 | 0.81 | 0.5 | 0.52 | 1 | 0.76 | M | $9.5 \times 10^{-7}$ | " |
| A-3 | 0.5 | 2200 | 0.81 | 0.5 | 0.58 | 1 | 0.81 | M | $2.9 \times 10^{-6}$ | " |
| B-1 | 0.7 | 2200 | 0.81 | 0.5 | 0.55 | 1 | 0.82 | M | $8.5 \times 10^{-5}$ | Comparison |
| B-2 | 0.5 | 2200 | 0.81 | 0.5 | 0.41 | 1 | 0.79 | M | $3.7 \times 10^{-5}$ | " |
| A-4 | 0.1 | 2200 | 0.81 | 0.4 | 0.39 | 0.8 | 0.62 | G | $4.0 \times 10^{-7}$ | Invention |
| A-5 | 0.2 | 2200 | 0.81 | 0.4 | 0.47 | 0.8 | 0.71 | G | $7.5 \times 10^{-7}$ | " |
| A-6 | 0.3 | 2200 | 0.81 | 0.4 | 0.5 | 0.8 | 0.75 | G | $9.9 \times 10^{-7}$ | " |
| A-7 | 0.1 | 2200 | 0.81 | 0.3 | 0.35 | 0.8 | 0.62 | G | $3.6 \times 10^{-7}$ | " |
| A-8 | 0.2 | 2200 | 0.81 | 0.3 | 0.38 | 0.8 | 0.71 | G | $5.5 \times 10^{-7}$ | " |
| B-3 | 0.5 | 2200 | 0.81 | 0.3 | 0.41 | 0.8 | 0.75 | G | $8.8 \times 10^{-5}$ | Comparison |
| A-9 | 0.1 | 2200 | 0.81 | 0.2 | 0.25 | 0.53 | 0.43 | G | $2.3 \times 10^{-7}$ | Invention |
| A-10 | 0.2 | 2200 | 0.81 | 0.2 | 0.28 | 0.53 | 0.54 | G | $3.3 \times 10^{-7}$ | " |
| B-4 | 0.3 | 2200 | 0.81 | 0.2 | 0.29 | 0.53 | 0.6 | G | $1.8 \times 10^{-5}$ | Comparison |
| B-5 | 0.1 | 2200 | 0.81 | 0.5 | 0.42 | 1.33 | 0.76 | B | $7.2 \times 10^{-5}$ | " |
| B-6 | 0.2 | 2200 | 0.81 | 0.5 | 0.52 | 1.33 | 0.85 | B | $3.7 \times 10^{-4}$ | " |
| B-7 | 0.5 | 2200 | 0.81 | 0.5 | 0.58 | 1.33 | 0.87 | B | $6.8 \times 10^{-4}$ | " |

TABLE 1-continued

| Sample No. | Magnetic Layer Thickness X (μm) | Hcp (Oe) | SQp | Y (μm) | HF Output (μV) | Z (μm) | LF Output (μV) | Wave Form | Error Rate | Remarks |
|---|---|---|---|---|---|---|---|---|---|---|
| B-8  | 0.1 | 2200 | 0.81 | 0.7 | 0.63 | 1.4 | 0.78 | B | $1.0 \times 10^{-4}$ | " |
| B-9  | 0.2 | 2200 | 0.81 | 0.7 | 0.69 | 1.4 | 0.89 | B | $2.8 \times 10^{-4}$ | " |
| B-10 | 0.5 | 2200 | 0.81 | 0.7 | 0.71 | 1.4 | 0.92 | B | $9.6 \times 10^{-3}$ | " |

Also, Samples A-11 to A-16 and B-11 and B-12 were prepared by changing the thickness of the magnetic layer and changing Hcp and SQp and they were evaluated by the same manners as above. The result obtained are shown in Table 2.

TABLE 2

| Sample No. | Magnetic Layer Thickness X (μm) | Hcp (Oe) | SQp | Y (μm) | HF Output (μV) | Z (μm) | LF Output (μV) | Wave Form | Error Rate | Remarks |
|---|---|---|---|---|---|---|---|---|---|---|
| A-1  | 0.2 | 3000 | 0.81 | 0.3 | 0.4  | 0.8  | 0.62 | G | $5.2 \times 10^{-7}$ | Invention |
| A-12 | 0.2 | 2000 | 0.81 | 0.3 | 0.37 | 0.8  | 0.71 | G | $8.7 \times 10^{-7}$ | " |
| A-13 | 0.2 | 1500 | 0.81 | 0.3 | 0.35 | 0.8  | 0.71 | G | $2.5 \times 10^{-6}$ | " |
| B-11 | 0.2 | 1200 | 0.81 | 0.3 | 0.21 | 0.8  | 0.72 | G | $4.5 \times 10^{-4}$ | Comparison |
| A-14 | 0.2 | 2200 | 0.9  | 0.3 | 0.42 | 0.8  | 0.7  | G | $1.1 \times 10^{-7}$ | Invention |
| A-15 | 0.2 | 2200 | 0.6  | 0.3 | 0.36 | 0.8  | 0.66 | G | $9.6 \times 10^{-7}$ | " |
| A-16 | 0.2 | 2200 | 0.4  | 0.3 | 0.3  | 0.8  | 0.59 | G | $6.8 \times 10^{-6}$ | " |
| B-12 | 0.2 | 2200 | 0.4  | 0.5 | 0.38 | 1.33 | 0.69 | M | $.2.2 \times 10^{-4}$ | Comparison |

[Comparison between Examples and Comparative Examples]

As is apparent from the results, it can be seen that the disk-form media of the present invention are the magnetic recording media having perpendicularly oriented components and since the media have a high output and a wave form near a peak pulse is obtained, an error rate is less and the media are excellent data recording media.

[Measurement Method]

Each sample of the floppy disks was measured by the following evaluation methods.

Measurement of Reproducing Output:

The measurement of the output was performed as follows. That is, using a disk test apparatus and SK606B type evaluation apparatus manufactured by Kokusai Densi Kogyo K.K. (former Tokyo Engineering K.K.), using a metal-in-gap head having a gap length of 0.3 μm, after recording a definite signal, the output signal of a head amplifier was measured with Oscilloscope Type 7633 (manufactured by Techtoronix Co.).

Magnetic Characteristics (Hcp, SQp=Br/Bm):

Using a vibrating sample magnetometer (manufactured by Tooei Kogyo K.K.) and the magnetic characteristics were measured at HM10KOe.

Thickness of Magnetic Layer:

A cut piece sample of the cross section of the layer was prepared and the thickness was determined with the sectional photograph obtained by photographing the image by a scanning type electron microscope (manufactured by Hitachi, Ltd.).

[Effect of the Invention]

In the present invention, the squareness ratio SQp in the perpendicular direction of the magnetic layer having a ferromagnetic hexagonal ferrite fine powder dispersed in a binder is at least 0.4, the coercive force Hcp of the magnetic layer in the perpendicular direction is at least 1500 Oe, and between the bit minimum inversion interval Y μm and the maximum interval Z μm of the digital signal to be recorded and the thickness X μm of the magnetic layer, there are the relationships of $X \leq Y \leq 0.8$ μm and $Z \leq 1.0$ μm, and thus the present invention can provide a magnetic recording medium having together excellent high-density recording characteristics and a less error rate, which have never been obtained by conventional techniques.

While the invention has been described in detail and with reference to specific embodiments thereof, it will be apparent to one skilled in the art that various changes and modifications can be made therein without departing from the spirit and scope thereof.

What is claimed is:

1. A magnetic recording medium having a recorded digital signal comprising a non-magnetic support having a substantially non-magnetic undercoating layer on the non-magnetic support and a magnetic layer comprising a ferromagnetic hexagonal ferrite powder dispersed in a binder on the undercoating layer in this order, wherein the squareness ratio SQp of the magnetic layer in the perpendicular direction is at least 0.4, the coercive force Hcp of the magnetic layer in the perpendicular direction is at least 1,500 Oe, and between the bit minimum inversion interval Y μm and the maximum inversion interval Z μm of a recorded digital signal and the thickness X μm of the magnetic layer, there are the following relationships;

$X \leq Y \leq 0.8$ μm $Z \leq 1.0$ μm.

2. The magnetic recording medium as in claim 1, wherein between the bit minimum inversion interval Y μm and the maximum inversion interval Z μm of a digital signal to be recorded and the thickness X μm of the magnetic layer, there are the following relationships;

$X \leq Y \leq 0.5$ μm $Z \leq 1.0$ μm, and the form of the magnetic recording medium is a disk.

3. The magnetic recording medium as in claim 1, wherein between the bit minimum inversion interval Y μm and the maximum inversion interval Z $\mu$m of a digital signal to be recorded and the thickness X $\mu$m of the magnetic layer, there are the following relationships;

X≦Y≦0.3 $\mu$m

Z≦0.6 $\mu$m, and the form of the magnetic recording medium is a disk.

4. The magnetic recording medium as in claim 1, wherein SQp is at least 0.6.

* * * * *